(12) United States Patent
Ahmed et al.

(10) Patent No.: US 9,847,733 B2
(45) Date of Patent: Dec. 19, 2017

(54) POWER CONVERSION SYSTEM WITH DC BUS REGULATION FOR ABNORMAL GRID CONDITION RIDE THROUGH

(71) Applicant: Rockwell Automation Technologies, Inc., Mayfield Heights, OH (US)

(72) Inventors: Ahmed Mohamed Sayed Ahmed, Mequon, WI (US); Prathamesh R. Vadhavkar, Brown Deer, WI (US); Brian J. Seibel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/152,961

(22) Filed: May 12, 2016

(65) Prior Publication Data
US 2017/0331389 A1 Nov. 16, 2017

(51) Int. Cl.
| | |
|---|---|
| H02M 5/45 | (2006.01) |
| H02M 5/458 | (2006.01) |
| H02M 1/08 | (2006.01) |
| H02P 23/00 | (2016.01) |
| H02P 27/06 | (2006.01) |
| H02M 5/42 | (2006.01) |
| H02M 5/453 | (2006.01) |

(52) U.S. Cl.
CPC ........... *H02M 5/4585* (2013.01); *H02M 1/08* (2013.01); *H02M 5/42* (2013.01); *H02M 5/453* (2013.01); *H02M 5/458* (2013.01); *H02P 23/0004* (2013.01); *H02P 27/06* (2013.01); *H02P 2201/03* (2013.01)

(58) Field of Classification Search
CPC ........ H02M 5/42; H02M 5/453; H02M 5/458; H02M 5/4585
See application file for complete search history.

(56) References Cited

U.S. PATENT DOCUMENTS

| | | | |
|---|---|---|---|
| 3,757,197 A | 9/1973 | Bailey | |
| 4,276,589 A | 6/1981 | Okawa et al. | |

(Continued)

FOREIGN PATENT DOCUMENTS

| | | |
|---|---|---|
| CN | 1823467 A | 8/2006 |
| CN | 101383576 A | 3/2009 |

(Continued)

OTHER PUBLICATIONS

English Translation of Chinese Office Action, CN 201310100331.8, dated Apr. 23, 2015, dated May 4, 2015.

(Continued)

*Primary Examiner* — Timothy J Dole
*Assistant Examiner* — Ishrat Jamali
(74) *Attorney, Agent, or Firm* — Fay Sharpe LLP

(57) ABSTRACT

Power conversion systems and methods are provided for ride through of abnormal grid conditions or disturbances, in which a system rectifier is operated in a first mode to regulate a DC voltage of an intermediate DC circuit, an inverter is operated in the first mode to convert DC power from the intermediate DC circuit to provide AC output power to drive a load. In response to detecting an abnormal grid condition, the system changes to a second mode in which the rectifier is turned off and the inverter regulates the DC voltage of the intermediate DC circuit using power from the load.

12 Claims, 3 Drawing Sheets

(56) References Cited

U.S. PATENT DOCUMENTS

| | | |
|---|---|---|
| 4,434,376 A | 2/1984 | Hingorani |
| 4,496,899 A | 1/1985 | Lippitt et al. |
| 4,545,002 A | 10/1985 | Walker |
| 4,833,389 A | 5/1989 | Kovalsky et al. |
| 4,870,338 A | 9/1989 | Abbondanti |
| 5,005,115 A | 4/1991 | Schauder |
| 5,041,959 A | 8/1991 | Walker |
| 5,883,775 A | 3/1999 | Maytum |
| 6,005,362 A | 12/1999 | Enjeti et al. |
| 6,118,676 A | 9/2000 | Divan et al. |
| 6,275,391 B1 | 8/2001 | Laskai et al. |
| 6,686,718 B2 | 2/2004 | Jadric et al. |
| 7,081,734 B1 * | 7/2006 | Jadric .................. H02M 7/797 318/767 |
| 7,102,247 B2 | 9/2006 | Feddersen |
| 7,129,599 B2 | 10/2006 | Divan et al. |
| 7,164,562 B2 | 1/2007 | Virtanen |
| 7,253,537 B2 | 8/2007 | Weng et al. |
| 7,411,309 B2 | 8/2008 | Hudson |
| 7,423,412 B2 | 9/2008 | Weng et al. |
| 7,514,907 B2 | 4/2009 | Rajda et al. |
| 7,518,256 B2 | 4/2009 | Juanarena Saragueta et al. |
| 7,622,815 B2 | 11/2009 | Rivas et al. |
| 7,868,581 B2 | 1/2011 | Qian et al. |
| 7,939,954 B2 | 5/2011 | Ruiz Flores et al. |
| 8,030,791 B2 | 10/2011 | Lang et al. |
| 8,350,397 B2 | 1/2013 | Lang et al. |
| 8,570,003 B2 | 10/2013 | Lu et al. |
| 9,041,234 B2 | 5/2015 | Lu et al. |
| 2006/0192522 A1 | 8/2006 | Kerkman et al. |
| 2006/0232250 A1 | 10/2006 | Sihler et al. |
| 2007/0216337 A1 | 9/2007 | Lu et al. |
| 2007/0268051 A1 | 11/2007 | Kerkman et al. |
| 2008/0067970 A1 | 3/2008 | Qian et al. |
| 2008/0067971 A1 | 3/2008 | Qian et al. |
| 2008/0203954 A1 | 8/2008 | Qian et al. |
| 2009/0058341 A1 | 3/2009 | Lu et al. |
| 2013/0134910 A1 | 5/2013 | Iwashita et al. |
| 2013/0234435 A1 * | 9/2013 | Wagoner ................ H02P 9/007 290/44 |
| 2013/0313826 A1 | 11/2013 | Gupta et al. |
| 2015/0103573 A1 * | 4/2015 | Zhu ........................ H02M 1/36 363/131 |

FOREIGN PATENT DOCUMENTS

| | | |
|---|---|---|
| CN | 102214931 A | 10/2011 |
| EP | 1965075 A1 | 9/2008 |
| WO | WO2004091085 A1 | 10/2004 |
| WO | WO 2009/116235 A1 | 9/2009 |

OTHER PUBLICATIONS

Extended European Search Report of European Application No. 17169431.8-1809 dated Oct. 17, 2017, 8 pages.

* cited by examiner

POWER CONVERSION SYSTEM WITH DC BUS REGULATION FOR ABNORMAL GRID CONDITION RIDE THROUGH

BACKGROUND INFORMATION

The following relates to motor drives, active front-end power converters, and abnormal grid conditions.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems and methods for ride through of abnormal grid conditions or disturbances, in which the system operates in a first or normal mode in which an active rectifier regulates a DC voltage of an intermediate DC circuit, and an inverter converts DC power from the intermediate DC circuit to provide AC output power to drive a load. In response to a detected abnormal grid condition, the system changes to a second mode in which the rectifier is turned off and the inverter regulates the DC voltage of the intermediate DC circuit using power from the load.

DETAILED DESCRIPTION

Figure 1:
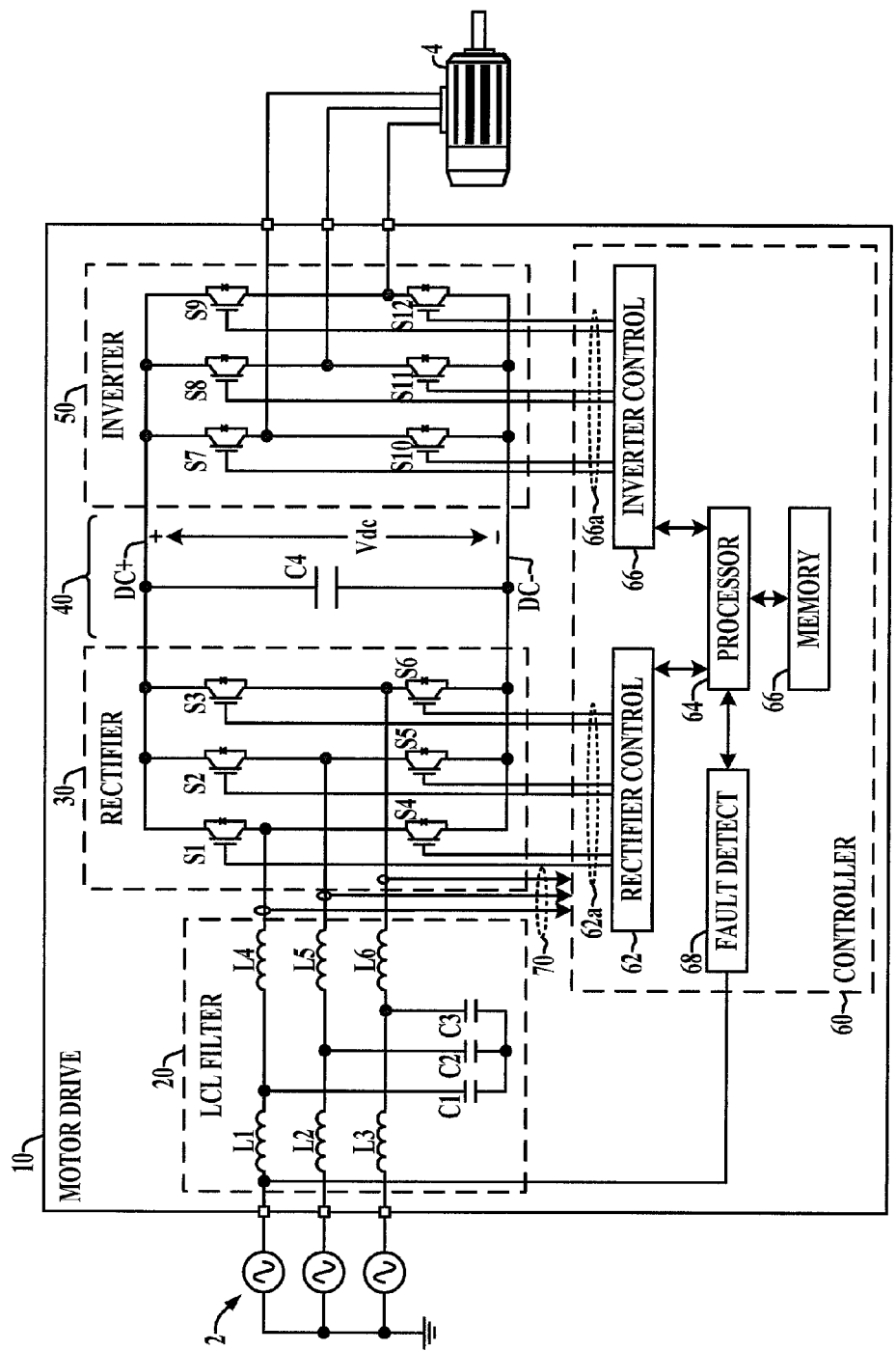
FIG. 1 is a schematic diagram.

Referring now in more detail to the figures, several embodiments or implementations are hereinafter described in conjunction with the drawings, wherein like reference numerals are used to refer to like elements throughout, and the various features are not necessarily drawn to scale. FIG. 1 shows a motor drive type power conversion system 10 receiving three-phase AC input power from a three-phase source 2, and the drive 10 operates in a normal operating mode to drive a motor load 4. Although illustrated in the context of three-phase input devices driving a three phase motor load, the disclosed concepts can be employed in multiphase power conversion systems having any number of input and output phases. The motor drive 10 includes a three-phase LCL input filter circuit 20 coupled between the AC input terminals and AC input terminals of an active or switching rectifier circuit 30 (alternately referred to as a converter).

The drive input 4 has three input phase terminals which are connected through the LCL input filter circuit 20 to the AC input of the rectifier circuit 30. In other examples L-C filters can be used. In the example of FIG. 1, the LCL filter circuit 20 includes inductors L1-L6 as well as Y-connected filter capacitors C1-C3. As seen in the example of FIG. 1, the example LCL filter circuit 20 includes three series circuits individually connected between the power converter input 4 and the corresponding phase of the rectifier AC input. Each series circuit includes a pair of filter inductors, with the first circuit including inductor L1 connected to the first power converter input terminal and a second filter inductor L4 connected between L1 and a phase input of the rectifier 30". Similarly, the second series circuit includes a first inductor L2 connected to the second power converter input terminal and a second filter inductor L5. The third series circuit includes a first inductor L3 connected to the third power converter input terminal and a third filter inductor L6. In addition, the filter circuit 20 includes three capacitors C1, C2, C3 individually connected between a corresponding one of the filter phases and a common connection point, such as a neutral, as shown. In other examples, the filter capacitors C1-C3 can be connected in a Delta configuration (not shown).

The drive 10 further includes an intermediate DC bus circuit 40, an inverter 50, and a controller 60 that includes a rectifier control component 62 and an inverter control component 66 to provide rectifier and inverter switching control signal 62a and 66a to operate the rectifier 30 and the inverter 50 in various modes as detailed further hereinafter. In other examples, the active front-end (AFE) rectifier 30 can be connected to provide a shared DC output for driving one or more loads, such as a plurality of inverters within a single system.

The power conversion system 10 includes advanced control capabilities implemented by the controller 60 for riding through abnormal grid conditions or other grid disturbances, in which a system rectifier 30 is operated in a first mode to regulate a DC voltage Vdc of an intermediate DC circuit 40, an inverter is operated in the first mode to convert DC power from the intermediate DC circuit 40 to provide AC output power to drive a load 4. In response to detecting an abnormal grid condition, the system changes to a second mode in which the rectifier 30 is turned off and the inverter 50 regulates the DC voltage Vdc of the intermediate DC circuit 40 using the Kinetic energy from the mechanical load 4. In this manner, the controller 60 uses kinetic energy from a spinning motor load 4 in order to prop up the DC bus voltage Vdc in the intermediate circuit 40 to help the system 10 ride through sagging grid voltages or other abnormal grid condition associated with the AC input source 2. This operation can advantageously enhance robustness and reliability of the power conversion system 10 during power disturbance transients. In certain examples, the controller 60 implements fault detection functionality 68 via a processor 64 and programming instructions in an associated memory 66 to detect abnormal grid conditions or disturbances. In one example, as shown in FIG. 1, the fault detection component or function 68 receives one or more sensor signals or values indicating the amplitude of the AC input voltage on one or more of the input lines. In one example, the controller 60 selectively identifies abnormal grid conditions when the AC input voltage amplitude drops by a certain threshold amount from an expected level. Other suitable abnormal grid condition detection algorithms and techniques can be used in other embodiments.

In normal operation, the controller 60 implements motor control functions to convert AC input power from the source 2 into DC power using the rectifier 30, and to convert DC power from the intermediate circuit 40 using the inverter 50 to generate variable frequency, variable amplitude three-phase AC output voltages and currents to drive the motor load 4. The switching rectifier 30 includes switching devices S1-S6 individually coupled between a corresponding one of the AC input phases and a corresponding DC bus terminal (DC+ or DC−) of the DC link circuit 40. The drive controller 60 includes a rectifier controller 62 that operates the rectifier 30 in a switching mode according to pulse width modulated (PWM) rectifier switching control signal 62a provided to the rectifier switches S1-S6 to cause the rectifier 30 to convert received three-phase AC input power to provide a DC voltage Vdc across a DC bus capacitance C4 of the link circuit 40 using any suitable pulse width modulation technique. The inverter 50 receives DC input power from the intermediate DC circuit 40 and includes inverter switches S7-S12 individually coupled between one of the positive or negative DC bus terminals and a corresponding output phase coupled in this example to the motor load 6. In certain examples, the inverter outputs are connected directly to the leads of the motor load 6. In other examples, one or more intervening components may be connected between the output of the inverter 50 and the motor load 4, such as a filter and/or a transformer (not shown). The inverter switches S7-S12 are operated according to inverter switching control signals 66a provided by an inverter control component 66 of the drive controller 60. The controller 60 generates the signals 66a according to any suitable pulse width modulation technique to convert DC power from the link circuit 40 to provide variable frequency, variable amplitude AC output power to drive the motor load 4. The switching rectifier 30 and the inverter 50 may employ any suitable form of switching devices S1-S12 including without limitation insulated gate bipolar transistors (IGBTs), silicon controlled rectifiers (SCRs), gate turn-off thyristors (GTOs), integrated gate commutated thyristors (IGCTs), etc.

As seen in FIG. 1, the controller 60 may include one or more components, which may be implemented as software and/or firmware components in execution, programmable logic, etc., including comparison logic operating to compare one or more computer calculated and/or measured values to one or more thresholds to facilitate detection of actual or suspected phase loss conditions. In addition, the controller 60 may provide an output signal (not shown) indicating that a phase is lost, and may also indicate which particular phase is lost. Thus, in one implementation, remedial action may be taken, such as shutting down the motor drive 10 and/or providing an alert or warning signal or other indication, for instance, to a user interface associated with the motor drive 10 and/or to a connected network (not shown).

Figure 2:
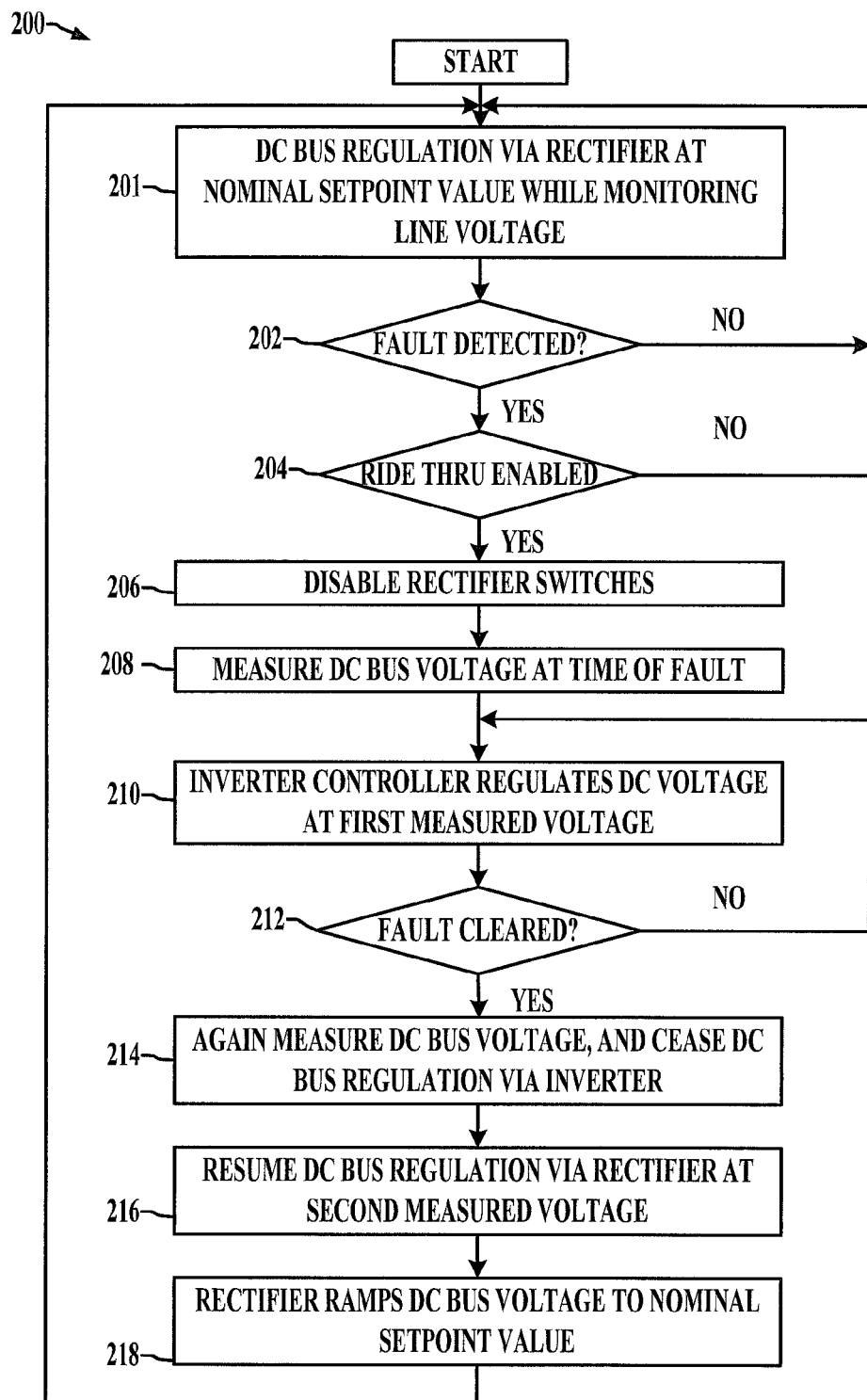
FIG. 2 is a flow diagram.

FIG. 2 shows an example process or method 200 to operate a power conversion system. In one possible implementation, the method 200 can be implemented by the controller 60 in order to operate the motor drive 10 shown in FIG. 1. In general, the process or method 200 includes operation in a first or normal mode in which the controller 60 operates the rectifier to regulate the DC voltage Vdc of the intermediate circuit 40 while the inverter 50 is operated to convert DC power from the circuit 40 to provide AC output power to drive the motor load 40. The method 200 further includes operation in a second mode, in response to detection of an abnormal grid condition, in which the controller 60 turns the switches S1-S6 of the rectifier 30 off, and provides switching control signals 66a to operate the inverter 50 to regulate the DC bus voltage Vdc. The method 200 starts in the first or normal operating mode, and the controller 60 monitors one or more line voltages at 201. In one example, the controller 60 assesses the line voltage to identify dips or sags in the AC input voltages At 202, the controller 60 implements the fault detection component 68 (FIG. 1) to determine whether an abnormal grid condition has been detected. If not (NO at 202), the controller 60 continues normal operating mode at 201 and 202.

If the controller 60 detects an abnormal grid condition (YES at 202), the controller 60 optionally checks if an abnormal grid condition ride through feature is enabled at 204. If so (YES at 202 and 204), the controller 60 changes from the first mode to the second mode in response to detecting the abnormal grid condition. This mode switch involves disabling the rectifier switches S1-S6 at 206 (e.g., using the suitable control signal 62a from the rectifier controller 62 in FIG. 1). In addition, the controller 60 in one implementation measures the DC bus voltage Vdc at 208 at or near the time the fault was detected. At 210, the controller 60 employs the inverter controller 66 to provide inverter switching control signals 66a to operate the switches S7-S12 of the inverter 50 to regulate the DC bus voltage Vdc. In certain examples, the rectifier and inverter controllers 62 and 66 perform handshaking to exchange a DC bus regulation point or setpoint reference value during changeover from the first mode to the second mode, and the inverter controller 66 regulates the DC bus voltage in the second mode to the same setpoint reference value used by the rectifier controller 62 in the first mode. In another example, the inverter controller 66 regulates the DC bus voltage at 210 according to the DC bus voltage value measured at 208. Any suitable pulse width modulated switching control algorithm can be used by the inverter controller 66 at 210 in order to selectively transfer power from the rotating motor load 4 to selectively charge the DC bus capacitor C4 in a controlled fashion to regulate the DC bus voltage Vdc.

The controller 60 in certain examples continues monitoring the input line voltage or voltages while the inverter 50 regulates the DC bus voltage. The controller 60 makes a determination at 212 in FIG. 2 as to whether the previously detected abnormal grid condition or disturbance condition has been cleared. If not (NO at 212), the controller 60 continues to operate the inverter controller to regulate the DC bus voltage while the rectifier 30 remains off at 210. Once the controller 60 determines that the fault condition has been cleared (YES at 212), the controller 60 again measures the DC bus voltage at 214. Also, the controller 60 switches from the second mode back to the first mode by ceasing or discontinuing DC bus regulation via the inverter 50 at 214 and resuming DC bus regulation via the rectifier 30 at 216. In one example, the controller begins rectifier-based DC bus regulation at 216 at the second measured voltage level. Thereafter, the controller 60 ramps the DC bus regulation setpoint or reference value up or down to a nominal setpoint value at 218. This advantageously mitigates current spikes associated with abrupt step changes in the operation of the rectifier 30 and the inverter 50 in controlling and regulating the DC bus voltage level Vdc.

Figure 3:
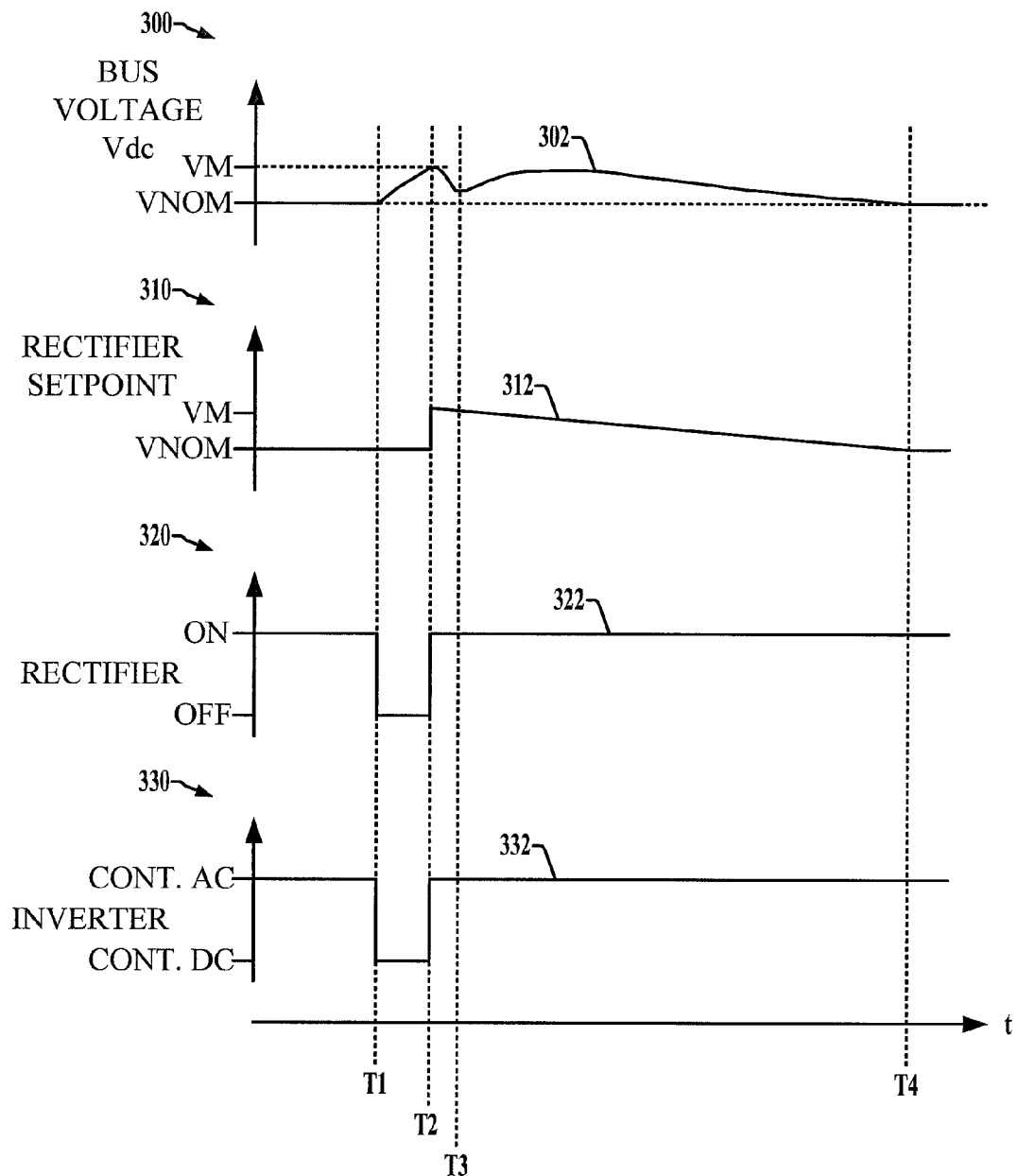
FIG. 3 is a waveform diagram.

FIG. 3 shows graphs 300, 310, 320 and 330 illustrating waveforms and state changes in the power conversion system 10 during operation according to the process 200. The graph 300 illustrates a DC bus voltage curve 302 representing the voltage Vdc. A curve 312 in the graph 310 shows a rectifier setpoint value used by the rectifier controller 62 in regulating the DC bus voltage in the first mode, and a curve 322 in graph 320 shows the operating state (OR) of the rectifier 30 in the first and second modes. The graph 330 includes a curve tree 22 showing the control operating state of the inverter 50, which transitions between controlling the AC output in the first mode and controlling or regulating the DC bus voltage in the second mode. In this example, an abnormal grid condition is detected at time T1, and the controller 60 responds by changing from the first mode operation to the second mode operation, including turning off the rectifier and causing the inverter 50 to control the DC bus voltage. In the example of FIG. 3, the DC bus voltage curve 302 undergoes an increase from T1 through T2 during regulation by the inverter 50. In other examples, the inverter 50 may regulate the DC bus voltage using closed loop control regulation to provide a more stable DC bus voltage level than as shown in the example of FIG. 3. As discussed above, moreover, the controller 60 may obtain a measurement of the DC bus voltage Vdc in response to detection of an abnormal grid condition, and use this value as a setpoint reference for regulation by the inverter controller 66 in the second mode.

At T2 in FIG. 3, the controller 60 detects clearance of the fault condition (YES at 212 in FIG. 2 above), and in response to this fault clearance detection, changes from the second mode to the first mode. In the example of FIG. 2, the controller 60 again measures the DC bus voltage at 214, shown in the graphs 300 and 310 of FIG. 3 as the measured voltage VM. As seen in FIG. 3, the first mode DC bus voltage regulation by the rectifier controller 62 uses a nominal reference voltage or setpoint shown in graphs 300 and 310 as VNOM. Changeover from inverter regulation to rectifier regulation following time T2 may lead to a slight ramp down in the DC bus voltage from T2 through T3 as shown in the curve 302 in FIG. 3. In this example, moreover, the controller 60 begins the resumption of rectifier-based DC bus voltage regulation at T2 according to a setpoint value that is set to the measured value VM. Thereafter, from T2 through T4, the controller 60 ramps down the setpoint value (e.g., curve 312 in FIG. 3) to the nominal value VNOM, and the closed loop regulation of the DC bus voltage curve 302 generally tracks this ramped setpoint. Absent this ramp operation, the rectifier 30 may begin operation at T2 using the nominal setpoint, which can be significantly different from the current operating level of the DC bus circuit 40. In that case, the rectifier control can attempt to overcompensate for the setpoint difference, leading to excessive rectifier currents. High rectifier currents, in turn, can lead to undesired tripping of the motor drive power conversion system 10. Moreover, the regulation of the DC bus voltage during brief or transitory abnormal grid conditions helps to avoid or mitigate undesired tripping based on low DC bus voltage levels in the intermediate circuit 40. Thus, the concepts of the present disclosure provide advanced abnormal grid condition ride through functions using pre-existing hardware in the motor drive 10 to facilitate continued operation of the system 10 and reduce the likelihood of shutdowns due to overcurrent or under voltage trips during transient grid voltage disturbances or faults.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including," "includes," "having," "has," "with," or variants thereof are used in the detailed description and/or in the claims, such terms are intended to be inclusive in a manner similar to the term "comprising." In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
   an AC input coupleable to receive AC input power from a power source;
   a rectifier, including a plurality of AC input terminals, first and second DC output terminals, and a plurality of rectifier switching devices individually coupled between a corresponding one of the AC input terminals and one of the first and second DC output terminals;
   a filter circuit coupled between the AC input and the rectifier;
   an inverter, including first and second DC input terminals, a plurality of AC output terminals, and a plurality of inverter switching devices individually coupled between a corresponding one of the DC input terminals and one of the AC output terminals;
   an intermediate DC circuit including a capacitor coupled between the first and second DC output terminals of the rectifier; and
   a controller operative in a first mode to provide rectifier switching control signals to operate the rectifier switching devices to regulate a DC voltage of the intermediate DC circuit according to a setpoint value, and to provide inverter switching control signals to operate the inverter switching devices to convert DC power from the intermediate DC circuit to provide AC output power to the AC output terminals;
   wherein the controller is operative in a second mode to provide the rectifier switching control signals to turn the rectifier switching devices off, and to provide the inverter switching control signals to operate the inverter switching devices to regulate the DC voltage of the intermediate DC circuit;
   wherein the controller is operative to detect an abnormal grid condition, to detect clearance of the abnormal grid condition, and to change from the second mode to the first mode in response to detection of clearance of the abnormal grid condition; and
   wherein the controller is operative to:
      measure the DC voltage in response to detection of clearance of the abnormal grid condition,
      initially set the setpoint value to the measured DC voltage value when changing from the second mode to the first mode, and
      ramp the setpoint value to a nominal setpoint value after changing from the second mode to the first mode.

2. The power conversion system of claim 1, wherein the controller is operative to change from the first mode to the second mode in response to detection of the abnormal grid condition.

3. The power conversion system of claim 2, wherein the controller is operative in the second mode to provide the inverter switching control signals to operate the inverter switching devices to regulate the DC voltage of the intermediate DC circuit according to a value of the DC voltage measured in response to detection of the abnormal grid condition.

4. The power conversion system of claim 1, wherein the controller is operative in the second mode to provide the inverter switching control signals to operate the inverter switching devices to regulate the DC voltage of the intermediate DC circuit according to a value of the DC voltage measured in response to detection of the abnormal grid condition.

5. A method to operate a power conversion system having a rectifier, an inverter, and an intermediate DC circuit coupled between the rectifier and the inverter, the method comprising:
  detecting an abnormal grid condition of an AC grid, and detecting clearance of the abnormal grid condition;
  in a first mode:
    operating the rectifier to convert an AC input signal from the AC grid to regulate a DC voltage of the intermediate DC circuit according to a setpoint value, and
    operating the inverter to convert DC power from the intermediate DC circuit to provide AC output power to drive a load;
  in a second mode in response to a detected abnormal grid condition of the AC grid:
    turning the rectifier off, and
    operating the inverter to regulate the DC voltage of the intermediate DC circuit using energy from the load;
  changing from the second mode to the first mode in response to detecting clearance of the abnormal grid condition;
  measuring the DC voltage in response to detecting clearance of the abnormal grid condition;
  initially setting the setpoint value to the measured DC voltage value when changing from the second mode to the first mode; and
  ramping the setpoint value to a nominal setpoint value after changing from the second mode to the first mode.

6. The method of claim 5, further comprising:
  changing from the first mode to the second mode in response to detecting the abnormal grid condition.

7. The method of claim 6, further comprising:
  in the second mode, operating the inverter to regulate the DC voltage according to a value of the DC voltage measured in response to detecting the abnormal grid condition.

8. The method of claim 5, further comprising:
  in the second mode, operating the inverter to regulate the DC voltage according to a value of the DC voltage measured in response to detecting the abnormal grid condition.

9. A non-transitory computer readable medium with computer executable instructions to operate a power conversion system having a rectifier, an inverter, and an intermediate DC circuit coupled between the rectifier and the inverter, the computer readable medium comprising computer executable instructions for:
  detecting an abnormal grid condition of an AC grid, and detecting clearance of the abnormal grid condition;
  in a first mode:
    operating the rectifier to convert an AC input signal from an AC grid to regulate a DC voltage of the intermediate DC circuit according to a setpoint value, and
    operating the inverter to convert DC power from the intermediate DC circuit to provide AC output power to drive a load;
  in a second mode in response to a detected abnormal grid condition of the AC grid:
    turning the rectifier off, and
    operating the inverter to regulate the DC voltage of the intermediate DC circuit using energy from the load;
  changing from the second mode to the first mode in response to detecting clearance of the abnormal grid condition;
  measuring the DC voltage in response to detecting clearance of the abnormal grid condition;
  initially setting the setpoint value to the measured DC voltage value when changing from the second mode to the first mode; and
  ramping the setpoint value to a nominal setpoint value after changing from the second mode to the first mode.

10. The non-transitory computer readable medium of claim 9, further comprising computer executable instructions for:
  changing from the first mode to the second mode in response to detecting the abnormal grid condition.

11. The non-transitory computer readable medium of claim 10, further comprising computer executable instructions for:
  in the second mode, operating the inverter to regulate the DC voltage according to a value of the DC voltage measured in response to detecting an abnormal grid condition.

12. The non-transitory computer readable medium of claim 9, further comprising computer executable instructions for:
  in the second mode, operating the inverter to regulate the DC voltage according to a value of the DC voltage measured in response to detecting an abnormal grid condition.

* * * * *